US010090951B2

United States Patent
Hwang et al.

(10) Patent No.: US 10,090,951 B2
(45) Date of Patent: *Oct. 2, 2018

(54) METHOD AND APPARATUS FOR SENDING NOTIFICATION ABOUT BROADCAST SERVICE IN A MOBILE BROADCAST SYSTEM

(71) Applicant: Samsung Electronics Co., Ltd., Gyeonggi-do (KR)

(72) Inventors: Sung-Oh Hwang, Gyeonggi-do (KR); Eun-Jung Kim, Gyeonggi-do (KR); Joon-Goo Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/623,127

(22) Filed: Jun. 14, 2017

(65) Prior Publication Data
US 2017/0288797 A1    Oct. 5, 2017

Related U.S. Application Data

(63) Continuation of application No. 13/274,895, filed on Oct. 17, 2011, now Pat. No. 9,692,536, which is a
(Continued)

(30) Foreign Application Priority Data

Jan. 25, 2005  (KR) .................. 10-2005-0006884
Jan. 26, 2005  (KR) .................. 10-2005-0007314
Feb. 28, 2005  (KR) .................. 10-2005-0016650

(51) Int. Cl.
*H04W 4/00*  (2018.01)
*H04H 60/72*  (2008.01)
(Continued)

(52) U.S. Cl.
CPC ............ *H04H 60/72* (2013.01); *H04H 20/57* (2013.01); *H04H 20/72* (2013.01); *H04H 40/27* (2013.01); *H04H 60/14* (2013.01)

(58) Field of Classification Search
CPC ........................... H04W 76/007; H04W 88/02
(Continued)

(56) References Cited

U.S. PATENT DOCUMENTS 7,113,783 B2   9/2006  Jou
7,203,506 B2   4/2007  Kim et al.
(Continued)

FOREIGN PATENT DOCUMENTS

JP   2003-023617   1/2003
KR   2000-0039950   7/2000
(Continued)

OTHER PUBLICATIONS

Yeon-Kyu Kim, "Advertisement Information Service Method in Mobile Communication System", Jul. 5, 2000.
(Continued)

*Primary Examiner* — Kiet Doan
(74) *Attorney, Agent, or Firm* — The Farrell Law Firm, P.C.

(57) ABSTRACT

A method and apparatus for transmitting a notification about broadcasting services in a broadcasting system are provided. A method of a network entity includes detecting a notification event about a broadcasting service, the notification event including a change of a service guide of the broadcasting service; generating a notification message about the notification event; determining which channel is used for a transmission of the notification message; and transmitting the notification message to a terminal or a group of terminals over the determined channel. The channel used for the transmission of the notification message is determined based
(Continued)

on whether the notification message is transmitted over a broadcast channel of a broadcast network or over an interaction channel of an interaction network. The service guide is generated based on service guide related information provided by a service provider of the broadcasting service.

26 Claims, 17 Drawing Sheets

Related U.S. Application Data continuation of application No. 11/339,143, filed on Jan. 25, 2006, now Pat. No. 8,064,885.

(51) Int. Cl.
*H04H 20/57* (2008.01)
*H04H 20/72* (2008.01)
*H04H 40/27* (2008.01)
*H04H 60/14* (2008.01)

(58) Field of Classification Search
USPC .... 455/404.2, 414.1, 404.1, 500, 411, 456.3, 455/435.1; 340/286.02, 539.11, 539.28; 370/342
See application file for complete search history.

(56) References Cited

U.S. PATENT DOCUMENTS

| | | | |
|---|---|---|---|
| 2002/0126780 A1* | 9/2002 | Oshima | G06Q 20/045 375/347 |
| 2003/0028884 A1 | 2/2003 | Swart et al. | |
| 2003/0051252 A1 | 3/2003 | Miyaoku et al. | |
| 2003/0093789 A1 | 5/2003 | Zimmerman et al. | |
| 2003/0169723 A1 | 9/2003 | Diachina et al. | |
| 2004/0022264 A1 | 2/2004 | McCue | |
| 2004/0246930 A1 | 12/2004 | Fong et al. | |
| 2005/0030966 A1 | 2/2005 | Cai et al. | |
| 2005/0090235 A1 | 4/2005 | Vermola et al. | |
| 2005/0176445 A1 | 8/2005 | Qu | |
| 2005/0195852 A1 | 9/2005 | Vayanos | |
| 2006/0072509 A1 | 4/2006 | Lindoff et al. | |
| 2006/0095543 A1 | 5/2006 | Ito et al. | |
| 2006/0126556 A1 | 6/2006 | Jiang et al. | |
| 2006/0178128 A1 | 8/2006 | Eaton et al. | |
| 2007/0209051 A1* | 9/2007 | Xu | H04H 20/26 725/63 |

FOREIGN PATENT DOCUMENTS

| | | |
|---|---|---|
| WO | WO 2004/017581 | 2/2004 |
| WO | WO 2004/056096 | 7/2004 |
| WO | WO 2004/091156 | 10/2004 |

OTHER PUBLICATIONS

Open Mobile Alliance, "Mobile Broadcast Services Architecture", Dec. 1, 2004.
3GPP, 3GPP TR 23.846 0.3.0, Jan. 2002.
David Mail, NDS, "ESG Architecture", OMA-BCAST-2005-0019-ESG-Architecture, Jan. 17, 2005.
Li Mo, ZTE Corp., "Terminal Provisioning", OMA-BCAST-2005-0030-CR-AD-Terminal-Provisioning.doc, Jan. 21, 2005.
OMA: "Mobile Broadcast Services Requirements", Draft Version 1.0, Open Mobile Alliance, OMA-RD_BCAST-V1_0-20041029-D, Oct. 29, 2004.
Helen Liao et al., "Proposed Resolution for SG AD Review Comments", Open Mobile Alliance, OMA-AD_BCAST-V1_0-20050505-D-CLEAN.doc, Aug. 18, 2005.

* cited by examiner

METHOD AND APPARATUS FOR SENDING NOTIFICATION ABOUT BROADCAST SERVICE IN A MOBILE BROADCAST SYSTEM

PRIORITY

This application is a Continuation of U.S. application Ser. No. 13/274,895, which was filed in the U.S. Patent and Trademark Office on Oct. 17, 2011, which is a Continuation of U.S. application Ser. No. 11/339,143, which was filed in the U.S. Patent and Trademark Office on Jan. 25, 2006, and issued as U.S. Pat. No. 8,064,885 on Nov. 22, 2011, and claims priority under 35 U.S.C. § 119 to Korean Application Serial No. 10-2005-0006884, which was filed in the Korean Intellectual Property Office on Jan. 25, 2005, to Korean Application Serial No. 10-2005-0007314, which was filed in the Korean Intellectual Property Office on Jan. 26, 2005, and to Korean Application Serial No. 10-2005-0016650, which was filed in the Korean Intellectual Property Office on Feb. 28, 2005, the contents of all of which are incorporated herein by reference.

BACKGROUND OF THE INVENTION

1. Field of the Invention

The present invention relates generally to a mobile broadcast system supporting Mobile Broadcast Service (BCAST), and in particular, to a method and apparatus for sending a notice of a notification event, like system and service changes, to one or a group of terminals.

2. Description of the Related Art

Owing to today's development of communication and broadcasting technologies, broadcasting systems or mobile communication systems provide BCAST services. A BCAST service that additionally sends packet data on a broadcast channel beyond the traditional audio- and video-oriented broadcast service is now under discussion.

BCAST is the process of service discovery and subscription by a BCAST-enabled terminal, provisioning of control information associated with the BCAST service, and transmission and reception of the BCAST service. Changes may occur due to many factors during the BCAST service and some of the changes must necessarily be notified to the terminal. Such changes are about service schedule or service reception information, for example.

A Service Guide (SG) providing information about BCAST services is essential to the terminal's service discovery. For BCAST reception, terminals always receive the SG.

FIGS. 1A and 1B illustrate an SG used in a conventional mobile broadcast system. Typical traditional audio/video broadcast services and packet transmission service are provided as BCAST services in the illustrated case. Specifically, FIG. 1A illustrates the structure of an SG message or file containing SG information about a plurality of BCAST services. FIG. 1B illustrates the structure of each SG in the SG message or file.

Referring to FIG. 1A, a Header 101 indicates the number of SGs in the SG message or file and the Identifier (ID), version, and length of the SG message or file. The terminal acquires generic information about the SG message from the Header 101. Reference numerals 102 and 103 denote SGs for BCAST service #1 to BCAST service #n. The structure of these SGs is illustrated in detail in FIG. 1B.

Referring to FIG. 1B, for each SG, a Header 111 includes general information about the SG, such as information about individual blocks in the SG, a service ID, and the version and length of the SG. Access Info 112 indicates how the BCAST service corresponding to the SG can be received. Thus, the Access Info 112 provides information about a channel on which the BCAST service is provided, the schedule of the BCAST service, and other information associated with reception of the BCAST service. Provisioning Info 113 provides billing information or security information required to receive the BCAST service. Terminal Requirement 114 indicates requirements for the terminal to receive the BCAST service. Besides these information blocks 112, 113 and 114, Preview Info 115 can further be included to provide preview information about the BCAST service.

Some of the SGs may vary at any time and each time an SG is changed, the updated SG must be sent. Considering, as is often the case in the nature of mobile broadcast, new terminals may join the BCAST service, the SG must be transmitted repeatedly even though the SG is not changed. For instance, if a user wants to join the BCAST service by turning on his terminal, or if a terminal needs to receive the SG as it roams, such a terminal must receive the SG separately from existing terminals already receiving the BCAST service.

Therefore, even the terminals which have already received the SG will also receive the SG and must check whether the SG has been updated. Since the SG is a message from an Application level, the highest level in a communications or broadcast protocol stack, the terminal cannot verify the current SG until receiving the entire SG message. A shortcoming with this SG reception method is serious power consumption in the terminals. If two or three SG messages are delivered for one minute, the terminals continue operating their receivers to receive the SG messages even though they are not receiving the BCAST service.

SUMMARY OF THE INVENTION

The present invention substantially solves at least the above problems and/or disadvantages and provides at least the advantages below.

Accordingly, the present invention provides a method and apparatus for enabling a terminal to receive an SG with reduced power consumption.

The present invention provides a method and apparatus for informing a terminal of a system change or a BCAST service change in a BCAST system.

The present invention provides a notification message structure for notifying of a BCAST change.

The present invention provides an efficient operation method between a transmission entity for sending a notification message about a BCAST service change and its lower network entities.

The present invention provides a method of efficiently sending a notification message about a BCAST change over an interaction network.

The present invention provides a method of efficiently sending a notification message about a BCAST change over a broadcasting network.

According to an aspect of the present invention, a method is provided for transmitting a notification about broadcasting services in a broadcasting system. The method includes detecting, by a network entity, a notification event about a broadcasting service, the notification event including a change of a service guide of the broadcasting service; generating, by the network entity, a notification message about the notification event; determining, by the network entity, which channel is used for a transmission of the notification message; and transmitting, by the network entity, the notification message to a terminal or a group of terminals over the determined channel. Determining which channel is used for the transmission of the notification message comprises determining whether the notification message is transmitted over a broadcast channel of a broadcast network or over an interaction channel of an interaction network. The service guide is generated based on service guide related information provided by a service provider of the broadcasting service According to another aspect of the present invention, a network entity is provided for transmitting a notification about broadcasting services in a broadcasting system. The network entity includes a processer for detecting a notification event related to a broadcasting service, generating a notification message about the notification event, and determining which channel is used for transmitting the notification message, the notification event including a change of a service guide of the broadcasting service; and a transmitter for transmitting the notification message to a terminal or a group of terminals over the channel determined by the processor. The processor determines whether the notification message is transmitted over a broadcast channel of a broadcast network or over an interaction channel of an interaction network. The service guide is generated based on service guide related information provided by a service provider of the broadcasting service.

According to another aspect of the present invention, a method is provided for receiving a notification about broadcasting services from a broadcasting system. The method includes receiving, by a terminal, a notification message over a broadcast channel of a broadcast network or an interaction channel of an interaction network; and detecting, by the terminal, a notification event about a broadcasting service based on the notification message. The channel over which the notification message is received is determined by a network entity. The notification event includes a change of a service guide of the broadcasting service. The service guide is generated based on service guide related information provided by a service provider of the broadcasting service.

According to another aspect of the present invention, a terminal is provided for receiving a notification about broadcasting services from a broadcasting system. The terminal includes a receiver for receiving a notification message over a broadcast channel of a broadcast network or an interaction channel of an interaction network; and a processor for detecting a notification event about a broadcasting service based on the received notification message. The channel over which the notification message is received is determined by a network entity. The notification event includes a change of a service guide of the broadcasting service. The service guide is generated based on service guide related information provided by a service provider of the broadcasting service.

BRIEF DESCRIPTION OF THE DRAWINGS

The above and other aspects, features, and advantages of certain embodiments of the present invention will become more apparent from the following detailed description when taken in conjunction with the accompanying drawings in which.

DETAILED DESCRIPTION OF THE EMBODIMENTS OF THE INVENTION

Various embodiments of the present invention will be described herein below with reference to the accompanying drawings. In the following description, well-known functions or constructions are not described in detail since they would obscure the invention in unnecessary detail.

It is to be appreciated that the following description is made of several embodiments of the present invention. While the names of entities defined by the asynchronous mobile communication standards, 3$^{rd}$ Generation Partnership Project (3GPP) or the mobile application standardization organization, Open Mobile Alliance (OMA), the present invention is not limited to these standards and names but applicable to any system with a similar technological background.

Embodiment 1

Figure 1A:
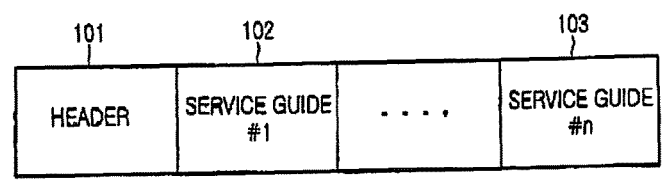
FIGS. 1A and 1B illustrate the structure of an SG message in a conventional mobile broadcast system.
Figure 1B:
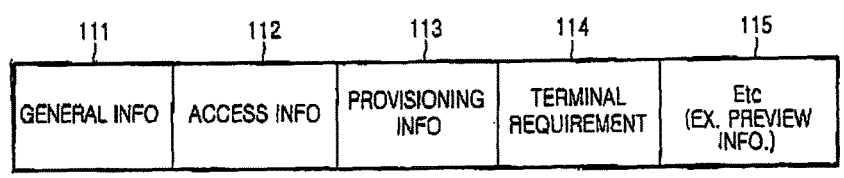
Figure 2:
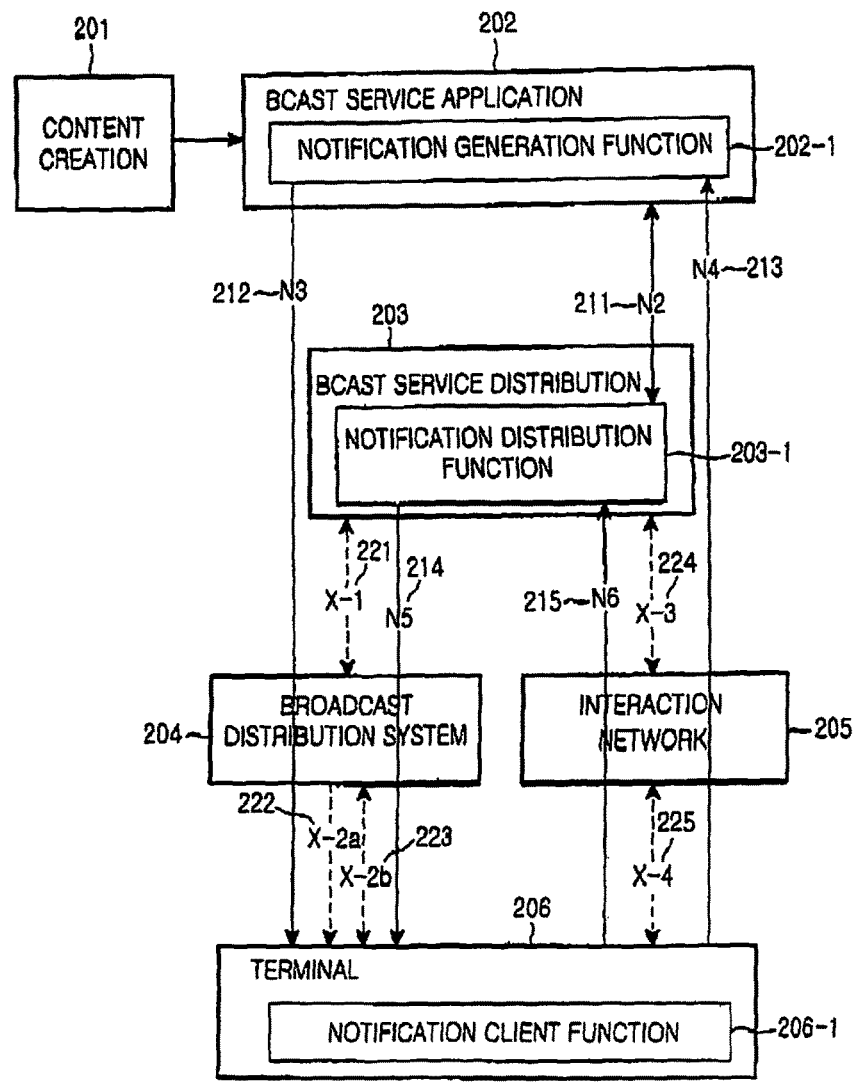
FIG. 2 illustrates a BCAST network architecture according to an embodiment of the present invention.

FIG. 2 illustrates a BCAST network architecture supporting BCAST according to an embodiment of the present invention. This BCAST network architecture is defined for the OMA BCAST standardized by the OMA. The illustrated entities are logical entities that may be physically discriminated. The logical entities can be merged into one or more physical entities.

Regarding the logical entities in the broadcasting system illustrated in FIG. 2, a Content Creation (CC) 201 is a BCAST service provider. BCAST services can be conventional audio/video broadcast service, file (music file and data file) download, etc.

A BCAST Service Application (SA) 202 receives BCAST service data from the CC 201 and processes the BCAST service data to BCAST service data to suit a BCAST network. It also generates an SG.

A BCAST Service Distribution (SD) 203 establishes bearers to deliver the BCAST service data received from the BCAST SA 202 and schedules BCAST service delivery. It is connected to a Broadcast Distribution System (BDS) 204 and an Interaction Network 205 supporting interactive communications.

The BDS 204 is a BCAST service delivery network. For example, it can be Digital Video Broadcasting Handheld (DVB-H), 3GPP Multimedia Broadcast Multicast Service (MBMS), or 3GPP2 Broadcast and Multicast Service (BCMCS).

The Interaction Network 205 sends BCAST service data in a point-to-point manner or bi-directionally exchanges control information and supplementary information related to BCAST service reception. It can be an existing 3GPP or 3GPP2 cellular network.

A terminal 206 is enabled to receive the BCAST services. It can access a cellular network depending on its capabilities. In the present invention, such a terminal that can be connected to a cellular network is assumed.

The interfaces between the logical entities will now be described below.

N2 211 interfaces between a Notification Generation Function 202-1 in the BCAST SA 202 and a Notification Distribution Function 203-1 in the BCAST SD 203. This interface is used for the Notification Generation Function 202-1 to receive necessary information from the BCAST SD 203 in order to generate a notification message, or to transmit the notification message to the BCAST SD 203.

N3 212 is an interface for sending a notification message generated from the BCAST SA 202 directly to one or a group of terminals, transparently passing the notification message through the BDS 204.

N4 213 is an interface for sending a notification message generated from the BCAST SA 202 directly to one or a group of terminals on a dedicated channel or channels of the terminal or terminals or a broadcast channel provided by the Interaction Network 205, transparently passing the notification message through the Interaction Network 205.

N5 214 is an interface for sending a notification message generated from the BCAST SD 203 directly to one or a group of terminals on a broadcast channel, transparently passing the notification message through the BDS 204.

N6 215 is an interface for sending a notification message generated from the BCAST SD 203 to one or a group of terminals on a dedicated channel/channels or an interaction broadcast channel provided by the interaction network 205, transparently passing the notification message through the interaction network 205.

X-1 221 is an interface for providing a transmission path from the BCAST SD 203 to the BDS 204 and providing a reception path for event information when an event occurs in the BDS 204.

X-2a 222 is a uni-directional interface for sending BCAST service-related control information from the BDS 204 to a terminal which cannot be connected to the interaction network 205.

X-2b 223 is a bi-directional interface for sending BCAST service-related control information from the BDS 204 to a terminal which cannot be connected to the interaction network 205 in the case where the BDS 204 has the interaction network functionality (i.e. MBMS or BCMCS).

X-3 224 is an interface for providing a transmission path from the BCAST SD 203 to the interaction network 205.

X-4 interface 225 is a bi-directional interface for sending BCAST service-related control information from the interaction network 205.

The N2, N3, N4, N5 and N6 interfaces are proposed according to the preferred embodiment of the present invention. The Notification Generation Function 202-1, the Notification Distribution Function 203-1, and a Notification Client Function 206-1 are also entities proposed according to the preferred embodiment of the present invention.

The Notification Generation Function 202-1 generates a notification message, for example, in the case where the start of a BCAST service needs to be announced, or a new SG needs to be sent based on a notice of a BCAST information change from the CC 201. The notification message is sent to the terminal 206 through the BDS 204 via N3, or through the interaction network 205 via N4.

The Notification Distribution Function 203-1 can also generate a notification message, when it receives a notice of a BCAST information change (e.g. rate control or service unavailability due to a radio network environment). This notification message is delivered to the terminal 206 via N5 or N6.

While not shown in FIG. 2, a notification message can be sent in the following way. When receiving information required for generation of a notification message from the Notification Generation Function 202-1 or the Notification Distribution Function 203-1 via X-3, the interaction network 205 sends the notification message to the terminal 206 by Short Messaging Service (SMS) or Multimedia Messaging (MMS).

The generation and transmission paths of a notification message have been addressed with reference to FIG. 2. Now a description will be made of the structure of the notification message referring to FIGS. 3A to 3E.

Figure 3A:
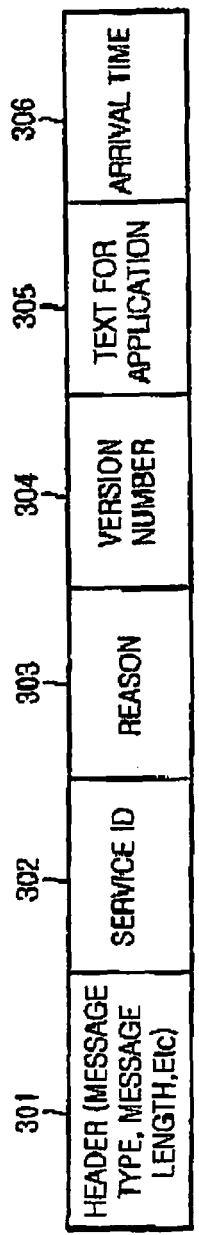
FIGS. 3A to 3E illustrate the structures of a notification message according to preferred embodiments of the present invention.

FIG. 3A illustrates the format of a notification message for BCAST according to the present invention. According to the purpose that the notification message serves, the information blocks of the notification message are partially or wholly used. In addition, the layout of the information blocks is not limited to the diagram of FIG. 3.

Referring to FIG. 3A, a Header 301 indicates a message type, a message length, and what blocks are carried in the notification message. When necessary, the message type may not be provided. A Service ID 302 identifies a BCAST service for which the notification message is created. The value of the Service ID 302 depends on the application range of the notification message because many types of IDs are available for one BCAST service, such as a service ID identified by a user, a service ID used in an application, and a service ID used in a transmitter.

A Reason 303 indicates the reason for sending the notification message. It can be set to service discontinuation, change of service start time, emergency, re-notice of service start time, or need for re-receiving an SG due to an SG change for the BCAST service associated with the notification message. A Version Number 304 is an optional information block indicating the version number of an SG for the BCAST service. The terminal determines whether the SG has been changed by the version number.

A Text for Application 305 provides an additional description about the reason set in the Reason 303, when needed. The description is written in a binary ASCII code or a language like Extensive Markup Language (XML). An Arrival Time 306 is an optional information block indicating the arrival time of the SG for the BCAST service. The terminal receives the SG by calculating the arrival time using the Arrival Time 306.

Figure 3B:
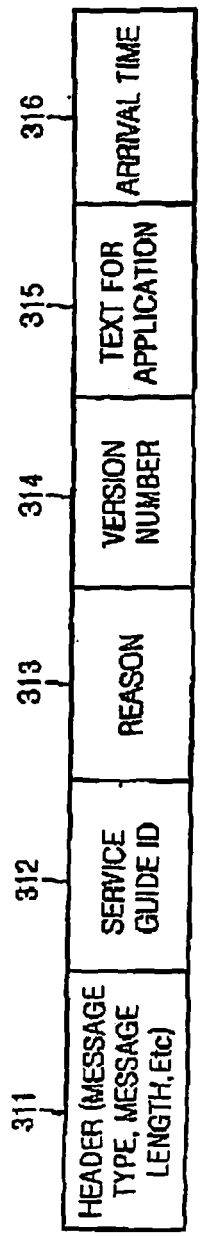

FIG. 3B illustrates the format for a notification message for notifying of an SG update according to the present invention.

Referring to FIG. 3B, a Header 311 indicates a message type, a message length, and what blocks are carried in the notification message. When necessary, the message type may not be provided. A Service Guide ID 312 identifies an SG. The value of the Service Guide ID 312 is an SG ID used at the first transmission of the SG so that the terminal can identify the SG.

A Reason 313 is an optional information block indicating the reason for sending the notification message. If the notification message is used to notify of the transmission of a new SG, the Reason 313 may not be provided. A Version Number 314 indicates the version number of an SG for a BCAST service associated with the notification message. The terminal determines whether to re-receive the SG according to the version number.

A Text for Application 305 provides an additional description about the reason set in the Reason 313, when needed. The description is written in a binary ASCII code or a language like XML. An Arrival Time 316 is an optional information block indicating the arrival time of the SG for the BCAST service. The terminal receives the SG by calculating the arrival time using the Arrival Time 306.

The notification message illustrated in FIG. 3B is useful for a network that cannot decide as to whether the SG has been sent at a lower layer, such as a DVB-H network. After receiving the notification message, the terminal receives a necessary SG. In the case where the terminal is receiving one BCAST service and an SG is sent for another subscribed BCAST service on another channel, this message format relieves the terminal of the inconvenience of periodically receiving the SG and checking whether the SG for the other BCAST service has been changed. Therefore, the terminal receives the other channel only when it is necessary to receive the SG, after receiving the notification message, thereby minimizing interruption of the on-going BCAST service.

Figure 3C:
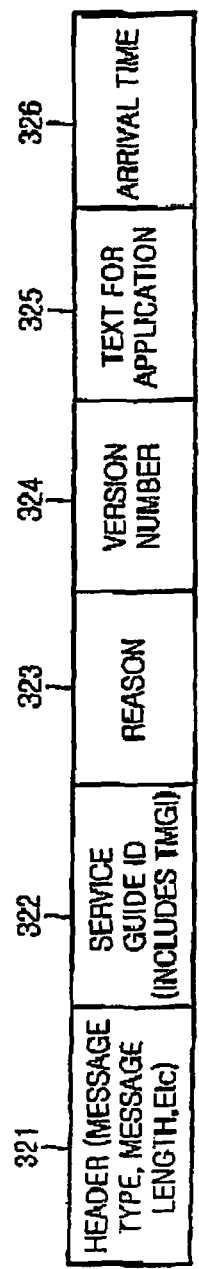

The notification message illustrated in FIG. 3C is useful for 3GPP MBMS as a BDS. A Header 321, a Reason 323, a Version Number 324, a Text for Application 325, and an Arrival Time 326 have the same meanings as their counterparts illustrated in FIG. 3B. Notably, this notification message provides a Temporal Mobile Group Identity (TMGI) identifying an MBMS service in addition to an SG ID in a Service Guide ID 322. In the 3GPP MBMS, a physical layer is aware of transmission of control information for a service and transmission of a service by the TMGI. How the TMGI is used in 3GPP is disclosed in detail in 3GPP Technical Specification (TS) 25.331 and thus its detailed description is not provided herein.

When finding out that an SG associated with the TMGI will be sent from the notification message having the structure of FIG. 3C, the terminal compares the SG with a stored SG and, if they are identical, it does not receive the SG, thus saving power.

Figure 3D:
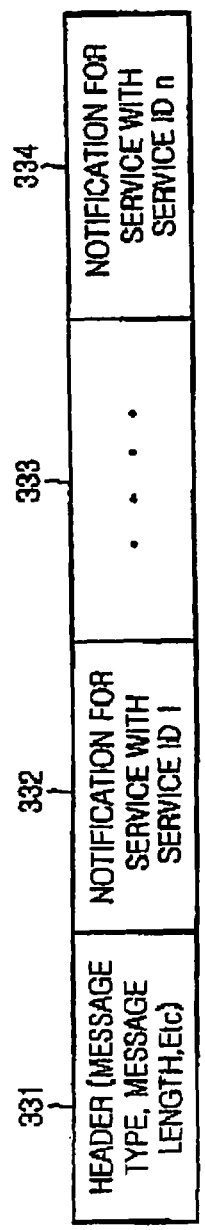

FIG. 3D illustrates the structure of an integrated notification message for carrying a plurality of notification message configured as illustrated in FIG. 3A for corresponding BCAST services. Referring to FIG. 3D, a Header 331 includes a message type, a length, and the number of the notification messages carried in the integrated notification message. Reference numerals 332 to 334 denote the notification messages for service #1 to service #n.

Figure 3E:

FIG. 3E illustrates the structure of an integrated notification message for carrying a plurality of notification message configured as illustrated in FIG. 3B for corresponding BCAST services. Referring to FIG. 3E, a Header 341 includes a message type, a length, and the number of the notification messages carried in the integrated notification message. Reference numerals 342 to 344 denote the notification messages for SG #1 to SG #n.

A procedure for sending a notification message to one or a group of terminals will be described according to embodiments of the present invention. While one terminal is taken for notational simplicity, it is clearly understood that the same description applies to a plurality of terminals.

Figure 4:
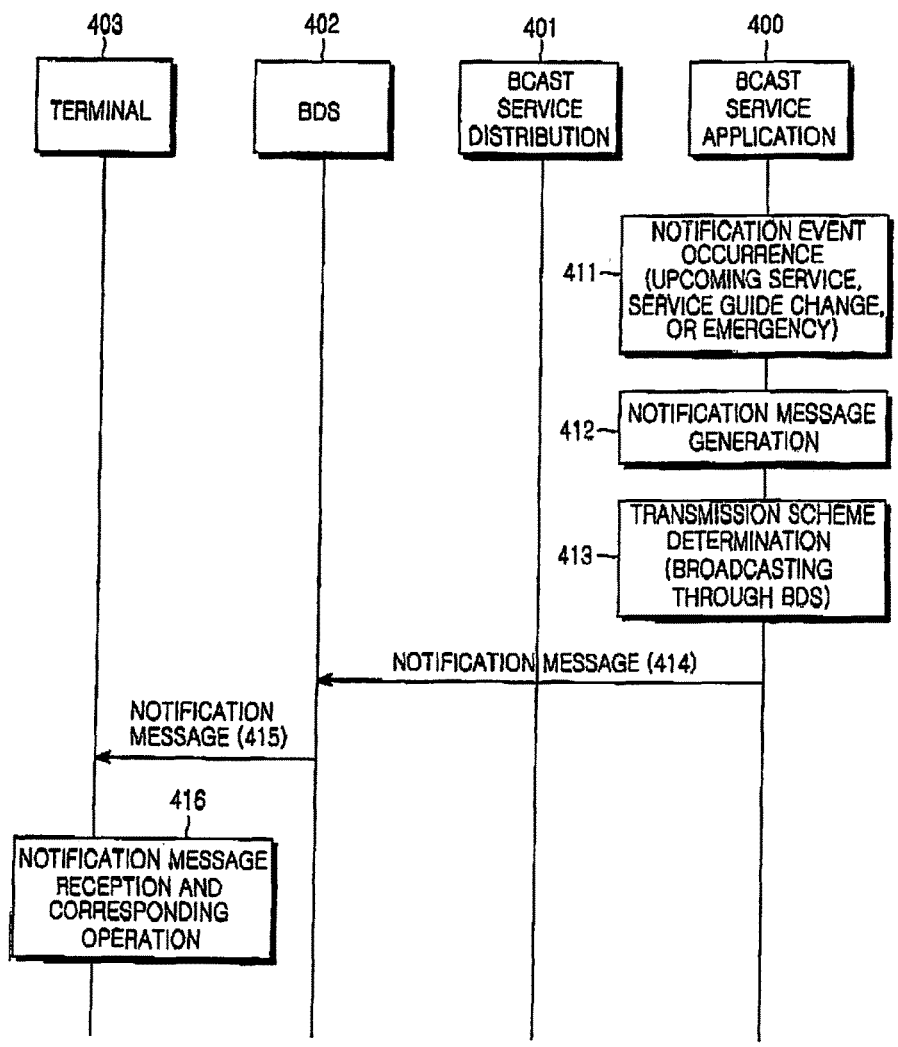
FIG. 4 illustrates a message flow for sending a notification message generated from a BCAST SA to a terminal through a BDS according to the embodiment of the present invention.

FIG. 4 illustrates a message flow for sending a notification message generated from the BCAST SA to the terminal through a BDS according to the present invention. A BCAST SA 400, a BCAST SD 401, a BDS 402 and a terminal 403 illustrated in FIG. 4 operate as illustrated in FIG. 2.

Referring to FIG. 4, upon generation of a notification event (e.g. upcoming service, change of an SG, emergency, etc.) in step 411, the BCAST SA 400 creates a notification message about the notification event in step 412 and decides to send the notification message through the BDS 402 in step 413. In the case where a significant event occurs to a service that a plurality of terminals have subscribed to, wired/wireless resources are saved by sending the notification message to them through the BDS 402. In step 414, the BCAST SA 400 sends the notification message to the BDS 402. The BDS 402 sends the notification message to the terminal 403 by an appropriate scheme in step 403. The appropriate scheme can be provisioning of a BCAST service which can deliver the notification message. In this case, the notification message is sent to the terminal 403 in service data of a virtual or certain BCAST service.

In step 416, the terminal 403 receives the notification message and operates in correspondence with the notification message. For example, the terminal 403 informs a user of a service schedule change or a changed SA. If the SA (i.e. version number) indicated by the notification message is identical to a stored SA (i.e. version number), the terminal 403 does not receive the SA, thus saving power.

Figure 5:
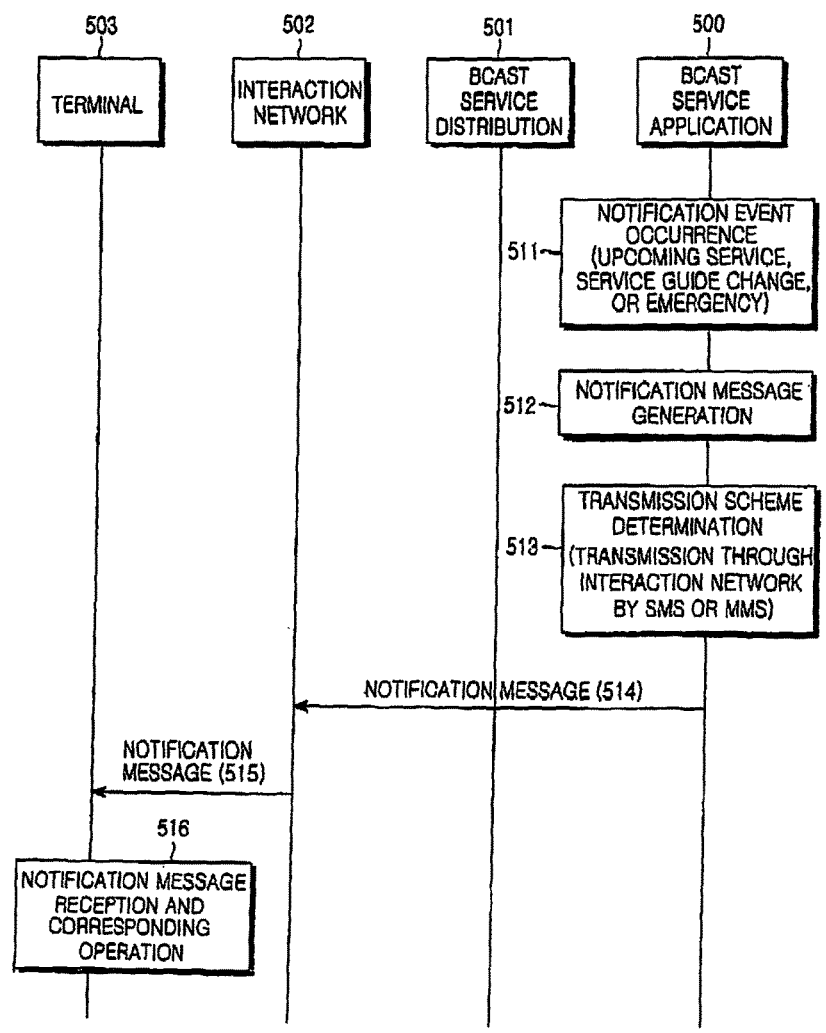
FIG. 5 illustrates a message flow for sending a notification message generated from the BCAST SA to the terminal through an interaction network according to the embodiment of the present invention.

FIG. 5 illustrates a message flow for sending a notification message generated from the BCAST SA to the terminal through the interaction network according to the present invention. A BCAST SA 500, a BCAST SD 501, an interaction network 502 and a terminal 503 illustrated in FIG. 5 operate as illustrated in FIG. 2.

Referring to FIG. 5, upon generation of a notification event in step 511, the BCAST SA 500 creates a notification message about the notification event in step 512 and decides to send the notification message through the interaction network 502 in step 513. In step 514, the BCAST SA 500 sends the notification message to the interaction network 502.

Two schemes are available to the BCAST SA 500 in sending the notification message. One of them is to include the notification message in an OMA SMS or MMS message so that the interaction network 502 simply forwards the SMS or MMS message. The other is to send the notification message to the interaction network 502 so that the interaction network 502 sends the notification message to the terminal 503 by an SMS or MMS message.

In step 515, the terminal 503 receives the notification message by the SMS or MMS message and operates in correspondence with the notification message, as was done in step 416 of FIG. 4.

Figure 6:
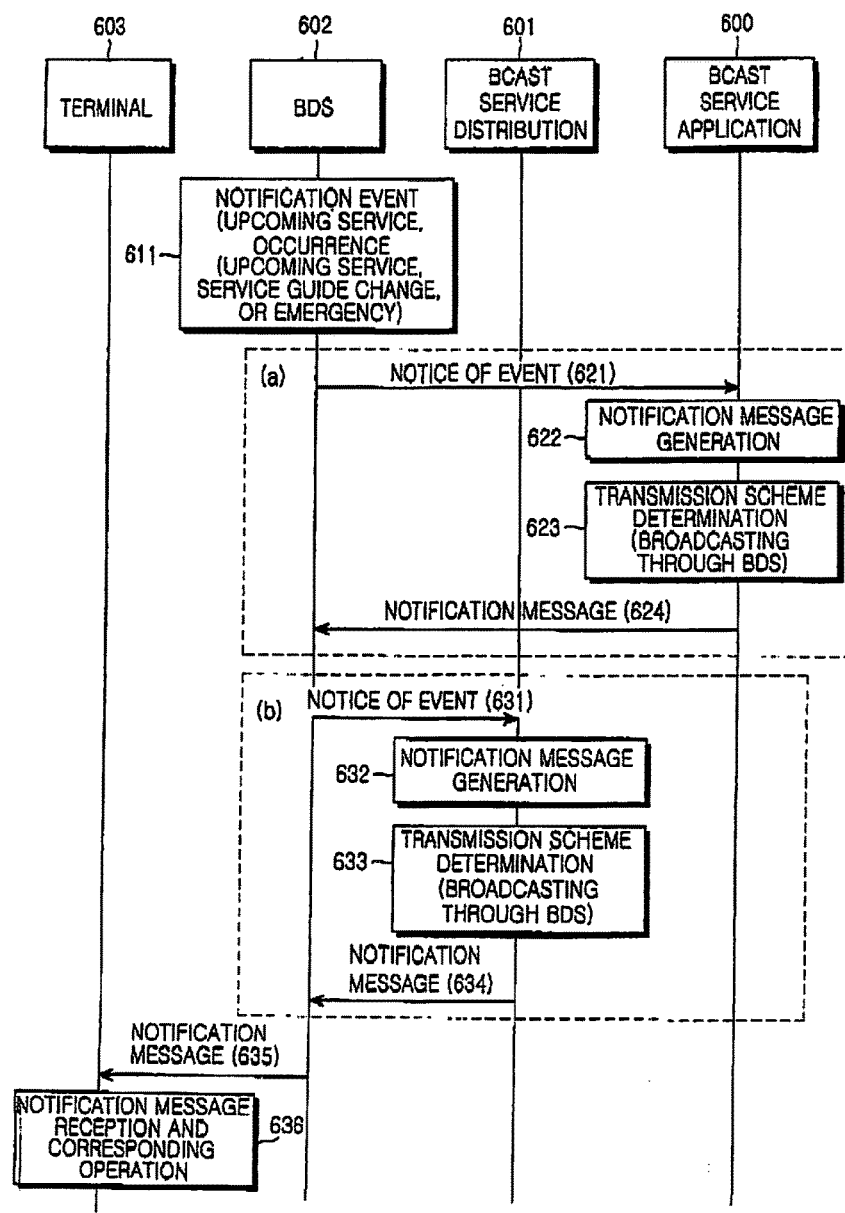
FIG. 6 illustrates a message flow for sending a notification message generated from the BCAST SA or a BCAST SD to the terminal through a broadcast network, when a notification event occurs in the BDS according to the embodiment of the present invention.
Figure 7:
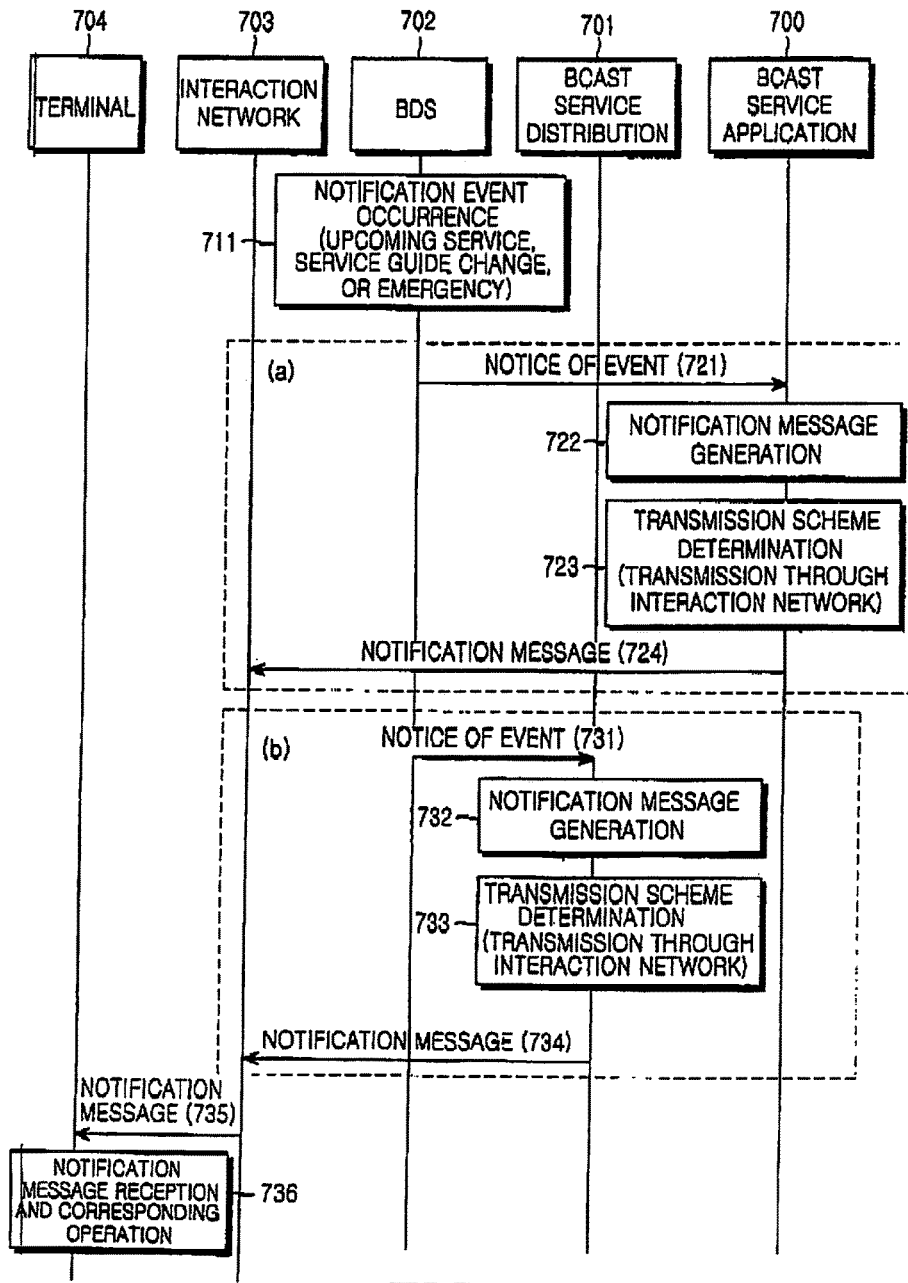
FIG. 7 illustrates a message flow for sending a notification message generated from the BCAST SA or the BCAST SD to the terminal through the interaction network, when a notification event occurs in the BDS according to the embodiment of the present invention.

FIGS. 6 and 7 illustrate signal flows for generating a notification message from the BCAST SA or the BCAST SD and sending it to the terminal, when a notification event occurs in the BDS according to the present invention.

Referring to FIG. 6, upon generation of a notification event like a service schedule change, a service rate change, or service unavailability due to a change in radio environment in step 611, a BDS 602 performs an operation (a) involving steps 621 to 624 or an operation (b) involving steps 631 to 634.

In the operation (a), the BDS 602 sends a notice of the notification event to a BCAST SA 600 in step 621. The BCAST SA 600 creates a notification message about the notification event in step 622 and determines a transmission scheme for the notification message, for example broadcasting through the BDS 602 herein in step 623. In step 624, the BCAST SA 600 delivers the notification message to the BDS 602. The BDS 602 sends the notification message to a terminal 603 in step 635 and the terminal 603 operates as indicated by the notification message in step 636.

In the operation (b), the BDS 602 sends a notice of the notification event to a BCAST SD 601 in step 631. The BCAST SD 601 creates a notification message about the notification event in step 632 and determines to send the notification message through the BDS 602 in step 633. In step 634, the BCAST SD 601 delivers the notification message to the BDS 602. Similarly as in the operation (a), the BDS 602 sends the notification message to the terminal 603 in step 635 and the terminal 603 operates as indicated by the notification message in step 636.

Referring to FIG. 7, upon generation of a notification event like a service schedule change, a service rate change, or service unavailability due to a change in radio environment in step 711, a BDS 702 performs an operation (a) involving steps 721 to 724 or an operation (b) involving steps 731 to 734.

In the operation (a), the BDS 702 sends a notice of the notification event to a BCAST SA 700 in step 721. The BCAST SA 700 creates a notification message about the notification event in step 722 and decides as to how to send the notification message, (for example, through an interaction network 703) in step 723. In step 724, the BCAST SA 700 delivers the notification message to the interaction network 703. The interaction network 703 sends the notification message to a terminal 704 in step 735 and the terminal 703 operates as indicated by the notification message in step 736.

In the operation (b), the BDS 702 sends a notice of the notification event to a BCAST SD 701 in step 731. The BCAST SD 701 creates a notification message about the notification event in step 732 and determines to send the notification message through the interaction network 703 in step 733. In step 734, the BCAST SD 701 delivers the notification message to the interaction network 703. Similarly to the operation (a), the interaction network 703 sends the notification message to the terminal 704 in step 735 and the terminal 704 operates as indicated by the notification message in step 736.

Embodiment 2

Figure 8:
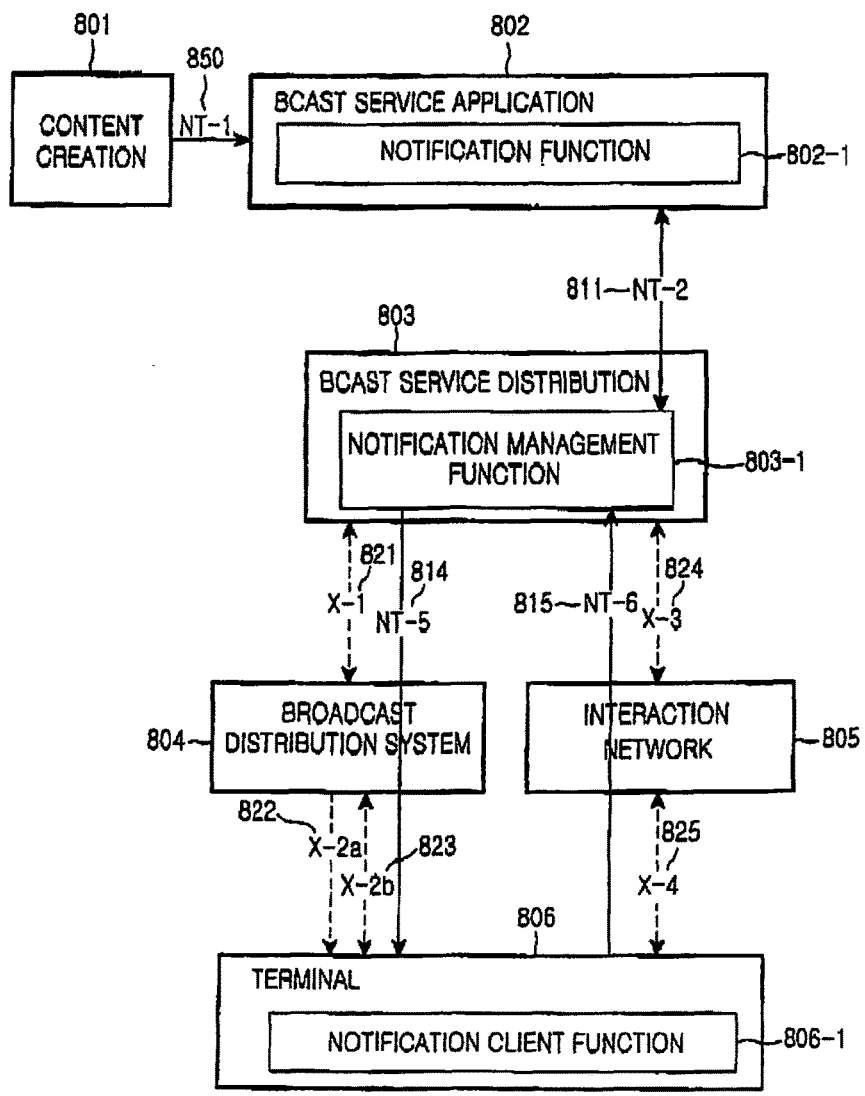
FIG. 8 illustrates a BCAST network architecture for sending a BCAST notification message according to another embodiment of the present invention.

FIG. 8 is a diagram illustrating a BCAST network architecture for sending a BCAST notification message according to another embodiment of the present invention. This BCAST network architecture is defined for the OMA BCAST standardized by the OMA. The illustrated entities are logical entities that may be physically discriminated or not. The logical entities can be merged into one or more physical entities.

Referring to FIG. 8, a CC 801 is a BCAST service provider and BCAST services can be conventional audio/video broadcast service, file (music file and data file) download, etc. When a problem or a change occurs in BCAST service provisioning, the CC 801 notifies a Notification Function 802-1 of a BCAST SA 802 of the problem or change.

The BCAST SA 802 receives BCAST service data from the CC 801 and processes the BCAST service data to BCAST service data suited to a BCAST network. It also generates standardized meta data necessary for an SG. Being informed of a change in a BCAST service by the CC 801, the BCAST SA 802 notifies a Notification Management Function 803-1 of a BCAST SD 803 of the change.

The BCAST SD 803 establishes bearers to deliver the BCAST service data received from the BCAST SA 802, schedules BCAST service delivery, and creates SGs. The BCAST SD 803 is connected to a BDS 804 and an interaction network 805 supporting bi-directional communications. Upon receipt of a notice of a BCAST service change or an SG update from the BDS 804 or the CC 801, the BCAST SD 803 creates a notification message by the Notification Management Function 803-1.

The BDS 804 is a BCAST service delivery network. For example, it can be DVB-H, 3GPP MBMS, or 3GPP2 BCMCS. When a change occurs in a certain BCAST service, the BDS 804 sends a notice of the notification event to the BCAST SD 803 via X-1 821.

The Interaction Network 805 sends BCAST services in a point-to-point manner or bi-directionally exchanges control information and supplementary information related to BCAST service reception. It can be an existing cellular network.

A terminal 806 is enabled to receive the BCAST services. It can access the cellular network depending on its capabilities. In the present invention, a terminal that can be connected to a cellular network is assumed. The terminal 806 receives a notification message via NT-5 814 by a Notification Client Function 806-1 and operates as indicated by the notification message. Alternatively, it receives a notification message from the Notification Management Function 803-1 of the BCAST SD 608 via NT-6 815 and operates as indicated by the notification message.

The interfaces between the logical entities will now be described below.

NT-1 850 interfaces between the Notification Function 802-1 in the BCAST SA 802 and the CC 801. When a notification event occurs in the CC 801, the CC 801 sends a notice of the notification event to the Notification Function 802-1 via NT-1.

NT-2 811 interfaces the Notification Function 802-1 in the BCAST SA 802 and the Notification Management Function 803-1 in the BCAST SD 803. NT-2 delivers a notice of a notification event or information required for generation of a notification message to the Notification Management Function 803-1.

NT-5 814 is an interface for sending a notification message generated from the Notification Management Function 803-1 directly to one or a group of terminals 806 on a broadcast channel, transparently passing the notification message through the BDS 804.

NT-6 815 is an interface for sending a notification message generated from the Notification Management Function 803-1 to one or a group of terminals 806 on a dedicated channel/channels or an interaction broadcast channel provided by the interaction network 805, transparently passing the notification message through the interaction network 805.

X-1 821 is an interface for providing a transmission path from the BCAST SD 803 to the BDS 804 and providing a reception path for a notice of a notification event that has occurred in the BDS 804.

X-2a 822 is a uni-directional interface for sending BCAST service-related control information from the BDS 804 to a terminal which cannot be connected to the interaction network 805.

X-2b 823 is a bi-directional interface for sending BCAST service-related control information from the BDS 804 in the case where the BDS 804 has the interaction network functionality (i.e. MBMS or BCMCS).

X-3 824 is an interface for providing a transmission path from the BCAST SD 803 to the interaction network 805.

X-4 interface 825 is a bi-directional interface for sending BCAST service-related control information from the interaction network 805.

The NT-1, NT-2, NT-5 and NT-6 interfaces are proposed according to the preferred embodiment of the present invention. The Notification Function 802-1, the Notification Distribution Function 803-1, and the Notification Client Function 806-1 are also entities proposed according to the preferred embodiment of the present invention.

The Notification Function 802-1 is responsible for sending information needed for generation of a notification message and, upon sensing occurrence of a notification event, sending a notice of the notification event to the Notification Management Function 803-1. A notification message can be generated in the case where the start of a BCAST service needs to be announced, or a new SG needs to be sent based on a notice of a BCAST service information change from the CC 801.

The Notification Distribution Function 803-1 generates a notification message, when it receives a notice of a BCAST information change (e.g. rate control or service unavailability due to a radio network environment). This notification message is delivered to the terminal 806 via NT-5 or NT-6.

Figure 9:
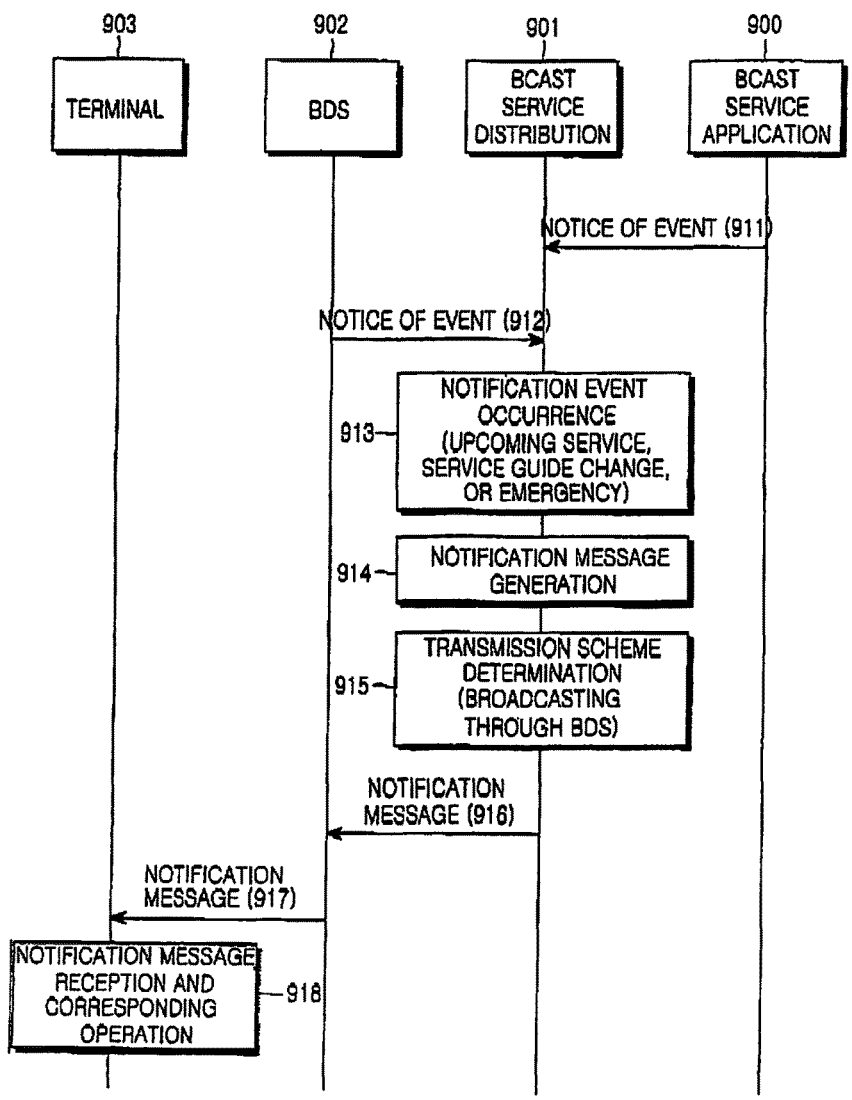
FIG. 9 illustrates a message flow for sending a notification message generated from a BCAST SD to a terminal through a BDS according to the second embodiment of the present invention.

FIG. 9 illustrates a message flow for sending a notification message generated from the BCAST SD to the terminal through the BDS according to the second embodiment of the present invention. A BCAST SA 900, a BCAST SD 901 including the Notification Management Function 803-1, a BDS 902 and a terminal 903 illustrated in FIG. 9 operate as illustrated in FIG. 8.

Referring to FIG. 9, a notification event occurs in step 911, step 912 or step 913. Specifically, upon generation of a notification event, the BCAST SA 900 sends a notice of the notification event to the BCAST SD 901 in step 911. Upon generation of a notification event in the BDS 902, the BDS 902 sends a notice of the notification event to the BCAST SD 901 in step 912. The Notification Management Function of the BCAST SD 901 receives the notice of the notification event from the BCAST SA 900 or the BDS 902, or senses occurrence of a notification event in the BCAST SD 901 in step 913.

The BCAST SD 901 creates a notification message about the notification event in step 914 and decides to send the notification message through the BDS 902 in step 915. In the case where a significant event occurs to a service that a plurality of terminals have subscribed to, wired/wireless resources are saved by sending the notification message to them through the BDS 902.

In step 916, the BCAST SD 901 sends the notification message to the BDS 902. The BDS 902 sends the notification message to the terminal 903 by an appropriate scheme in step 917. The appropriate scheme can be provisioning of a BCAST service which can deliver the notification message.

In step 918, the terminal 903 receives the notification message and operates in correspondence with the notification message. For example, the terminal 903 informs a user of a service schedule change or a changed SA. If the SA indicated by the notification message is identical to a stored SA, the terminal 903 does not receive the SA, thus saving power.

Figure 10:
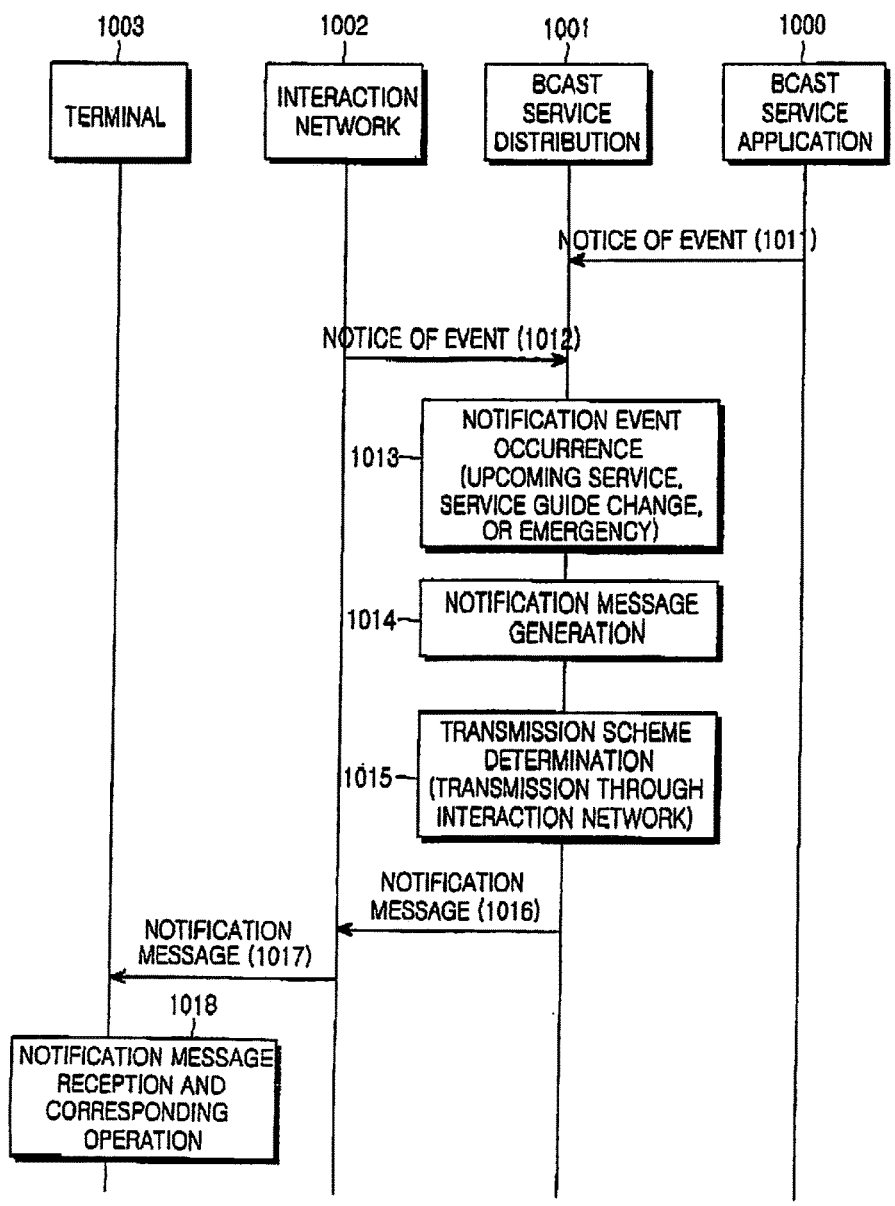
FIG. 10 illustrates a message flow for sending a notification message generated from the BCAST SD to the terminal through an interaction network according to the second embodiment of the present invention.

FIG. 10 illustrates a message flow for sending a notification message generated from the BCAST SD to the terminal through the interaction network according to the second embodiment of the present invention. A BCAST SA 1000, a BCAST SD 1001 including the Notification Management Function 803-1, an interaction network 1002 and a terminal 1003 illustrated in FIG. 10 operate as illustrated in FIG. 8.

Referring to FIG. 10, a notification event occurs in step 1011, step 1012 or step 1013. Specifically, upon generation of a notification event, the BCAST SA 1000 sends a notice of the notification event to the BCAST SD 1001 in step 1011. Upon generation of a notification event in the interaction network 1002, the interaction network 1002 sends a notice of the notification event to the BCAST SD 1001 in step 1012. The Notification Management Function of the BCAST SD 1001 receives the notice of the notification event from the BCAST SA 1000 or the interaction network 1002, or senses occurrence of a notification event in the BCAST SD 1001 in step 1013.

The BCAST SD 1001 creates a notification message about the notification event in step 1014 and decides to send the notification message through the interaction network 1002 in step 1015. In step 1016, the BCAST SD 1001 sends the notification message to the interaction network 1002. Two schemes are available to the BCAST SD 1001 in sending the notification message. One of them is to include the notification message in an OMA SMS or MMS message by the BCAST SA 1000 so that the interaction network 1002 simply forwards the SMS or MMS message. The other is to send the notification message to the interaction network 1002 so that the interaction network 1002 sends the notification message to the terminal 1003 by an SMS or MMS message.

In step 1017, the interaction network 1002 sends the notification message to the terminal 1003 by the SMS or MMS message. Then the terminal 1003 operates in correspondence with the notification message, as described earlier, in step 1018.

Embodiment 3

Figure 11:
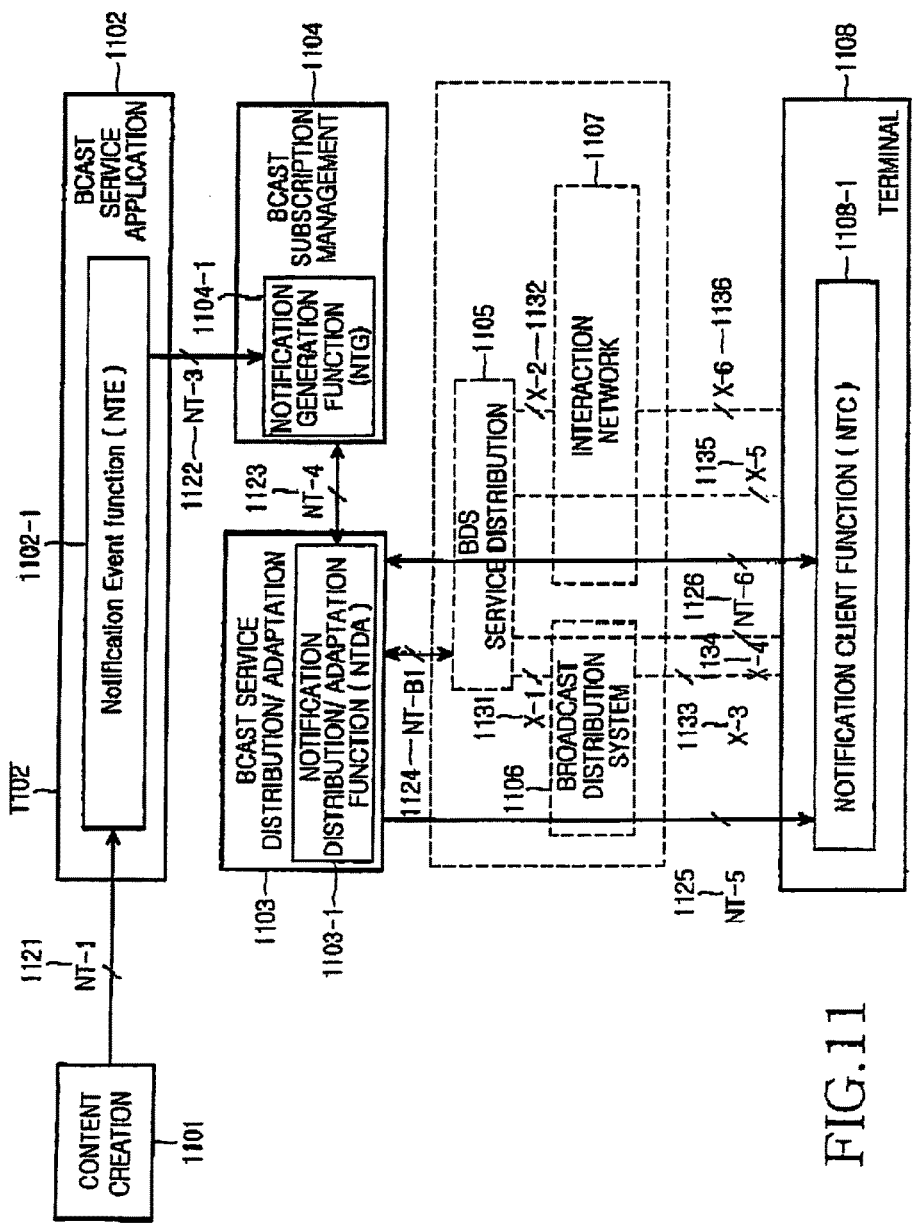
FIG. 11 illustrates a BCAST network architecture for sending a BCAST notification message according to a third embodiment of the present invention.

FIG. 11 illustrates a BCAST network architecture for sending a BCAST notification message according to a third embodiment of the present invention. The illustrated entities are logical entities that may be physically discriminated. The logical entities can be merged into one or more physical entities. Only the interfaces related to transmission of a notification message according to the present invention are shown here.

Referring to FIG. 11, a CC 111 is a BCAST service provider and BCAST services can be conventional audio/video broadcast service, file (music file and data file) download, etc. When a problem or a change occurs in BCAST service provisioning, the CC 1101 sends a notice of the notification event to a Notification Event Function (NTE) 1102-1 of a BCAST SA 1102.

The BCAST SA 1102 receives BCAST service contents from the CC 1101 and processes the BCAST service data to BCAST service data (e.g. streaming audio/video or movie download) suitable for a BCAST network. It also generates standardized meta data necessary for an SG and charging information for users. When receiving a notice of a notification event indicating a change in a BCAST service from the CC 1101, the BCAST SA 1102 notifies a Notification Generation Function (NTG) 1104-1 of a BCAST Subscription Management (SM) 1104 of the notification event and sends SG attributes for use in generation of a notification message to the NTG 1104-1.

The BCAST Service Distribution/Adaptation (SD/A) 1103 aggregates BCAST service data received from the BCAST SA 1102, establishes bearers to deliver the BCAST service data, schedules BCAST service delivery, and creates SGs. The BCAST SD/A 1103 is connected to a BDS 1106 and an interaction network 1107 supporting bi-directional communications. The BCAST SD/A 1103 includes a Notification Distribution/Adaptation Function (NTDA) 1103-1, for sending a notification message received from the BCAST SM 1104 to one or a group of terminals through the BDS 1106 or the interaction network 1107.

The BCAST SM 1104 is responsible for managing subscription information for BCAST service reception, service provisioning information, and device information about terminals to receive BCAST services. It sends user charging information to the BCAST SA 1102 and provides the subscription information, service provisioning information and device information to the BDS 1106 and an interaction network 1132. Particularly, the BCAST SM 1104 includes the NTG 1104-1, for receiving a notice of a notification event from the BCAST SA 1102, the BCAST SD/A 1103, and the BDS 1106 and generating a notification message about the notification event, or generating a notification message about a notification event that has occurred in the BCAST SM 1104.

Once the notification message is generated, the NTG 1104-1 can efficiently find out which recipients of the notification message (e.g. terminals which have subscribed to a BCAST service associated with the notification message), referring to the subscription information and device information of one terminal or a group of terminals. For example, the NTG 1104-1 sends to a specific user a notification message for a specific service on which the user sets his or her preference, referring to the user profile managed by the BCAST SM 1104. In another case, the NTG 1104-1 sends to a specific group of users, referring to the user profiles. In a third case, the NTG 1104-1 generates a notification message about SG update, referring to SG-related information received from the BCAST SD/A 1103.

A BDS Service Distribution (BDS SD) 1105 distributes all received BCAST service data or information received from the BCAST SM 1104 to the BDS 1106 or the interaction network 1107 so that the BCAST service data or the information can be sent on a broadcast channel or an interactive channel. The BDS SD 1105 may or may not exist according to the type of the BDS 1106.

The BDS 1106 is a BCAST service delivery network. For example, it can be DVB-H, 3GPP MBMS, or 3GPP2 BCMCS. When a change occurs in a certain BCAST service, the BDS 1106 sends a notice of the notification event to the BCAST SD/A 1103 via X-1 1131, or when the BDS SD 1105 exists, via NT-B1 1124.

The Interaction Network 1107 sends BCAST services in a point-to-point manner or bi-directionally exchanges control information and supplementary information related to BCAST service reception. It can be an existing cellular network.

A terminal 1108 is enabled to receive the BCAST services. It can access the cellular network depending on its capabilities. In the present invention, a terminal that can be connected to a cellular network is assumed. The terminal 1108 receives a notification message via NT-5 1125 or via NT-6 1126 by a Notification Client Function (NTC) 1108-1 and operates as indicated by the notification message.

The interfaces between the logical entities will now be described below.

NT-1 1121 interfaces between the NTE 1102-1 in the BCAST SA 1102 and the CC 1101. When a notification event occurs in the CC 1101, the CC 1101 sends a notice of the notification event to the NTE 1102-1 via NT-1.

NT-3 1122 interfaces the NTE 1102-1 to the NTG 1104-1. NT-3 delivers to the NTG 1104-1 a notice of a notification event generated from the CC 1101 or the BCAST SA 1102 or information required for generation of a notification message, such as SG attributes.

NT-4 1123 interfaces between the NTG 1104-1 and the NTDA 1103-1. It is used to send a notification message generated from the NTG 1104-1 to the NTDA 1103-1, for transmission to the BDS 1106 or the interaction network 1107, or to send to the NTG 1104-1 a notice of a notification event which has occurred in the BCAST SD/A 1103 or the BDS 1106 or information required for generation of a notification message.

NT-5 1125 is an interface for sending a notification message from the NTDA 1103-1 directly to one or a group of terminals 1108 on a broadcast channel, transparently passing the notification message through the BDS 1106.

NT-6 1126 is an interface for sending a notification message from the NTDA 1103-1 to a terminal 1108 on a dedicated channel/channels or an interaction broadcast channel provided by the interaction network 1107, transparently passing the notification message through the interaction network 1107. If the same notification message is sent to a plurality of terminals, multiple NT-6 interfaces can be used.

NT-B1 1124 is an interface for providing a transmission path from the BCAST SD/A 1103 to the BDS 1106 and providing a reception path for a notice of a notification event which has occurred in the BDS 1106. It interfaces the BCAST SD/A 1103 with the BDS SD 1105. A notification message is transferred to the BDS 1106 or the interaction network 1107 via NT-B1.

X-1 1131 is an interface for providing a transmission path from the BCAST SD/A 1103 to the BDS 1106 and providing a reception path for a notice of a notification event generated in the BDS 1106, in the case where the BDS SD 1105 does not exist. In the presence of the BDS SD 1105, it interfaces the BDS 1106 with the BDS SD 1105, for sending a notice of a notification event generated in the BDS 1106.

X-2 1132 is an interface for providing a transmission path from the BCAST SD/A 1103 to the interaction network 1107, in the absence of the BDS SD 1105. In the presence of the BDS SD 1105, it interfaces between the BDS 1106 and the interaction network 1107, for establishing a bearer for a notification message in the interaction network 1107 and sending the notification message.

X-3 1133 interfaces between the BDS 1106 and the terminal 1108, for BCAST service transmission or transmission of all messages on a broadcast channel.

X-4 1134 is a broadcast channel interface between the BDS SD 1105 and the terminal 1108.

X-5 1135 is an interaction channel interface between the BDS SD 1105 and the terminal 1108.

X-6 1136 is a bi-directional interface. The interaction network 1107 can send BCAST service-related control information via X-6.

The NT-1, NT-3, NT-4, NT-B1, NT-5 and NT-6 interfaces are proposed according to the preferred embodiment of the present invention. Also, the NTE 1102-1, the NTDA 1103-1, the NTG 1104-1, and the NTC 1108-1 are entities proposed according to the preferred embodiment of the present invention.

The NTE 1102-1 is responsible for sending information needed for generation of a notification message and, upon sensing occurrence of a notification event, sending a voice of the notification event to the NTG 1104-1. To be more specific, the NTE 1102-1 receives a notice of a notification event from the CC 1101 via NT-1 and sends it to the NTG 1104-1 via NT-3. Also, the NTE 1102-1 sends SG information required for generation of a notification message to the NTG 1104-1 via NT-3.

The NTG 1104-1, upon receipt of information required for notification message generation and/or a notice of a notification event, generates a notification message and sends it to the NTDA 1103-1. The notification event may happen in the CC 1101, the BCAST SM 1104, the BCAST SD/A 1103, and the BDS 1106. A notification message can be generated in the case where the start of a BCAST service needs to be announced, or a new SG needs to be sent based on a notice of a BCAST service information change from the CC 1101, or a special event occurs in the BDS 1106.

The NTDA 1103-1 is responsible for sending the notification message via NT-5 or NT-6. When it receives a notice of a BCAST information change (e.g. rate control or service unavailability due to a radio network environment), the NTDA 1103-1 sends a notice of the notification event to the NTG 1104-1 via NT-4. A notice of a notification event that has happened in the BDS 1106 is sent to the NTG 1104-1 via NT-B1 and NT-4. If the BDS SD 1105 does not exist, the notice of the notification event is sent to the NTG 1104-1 via X-1.

Figure 12:
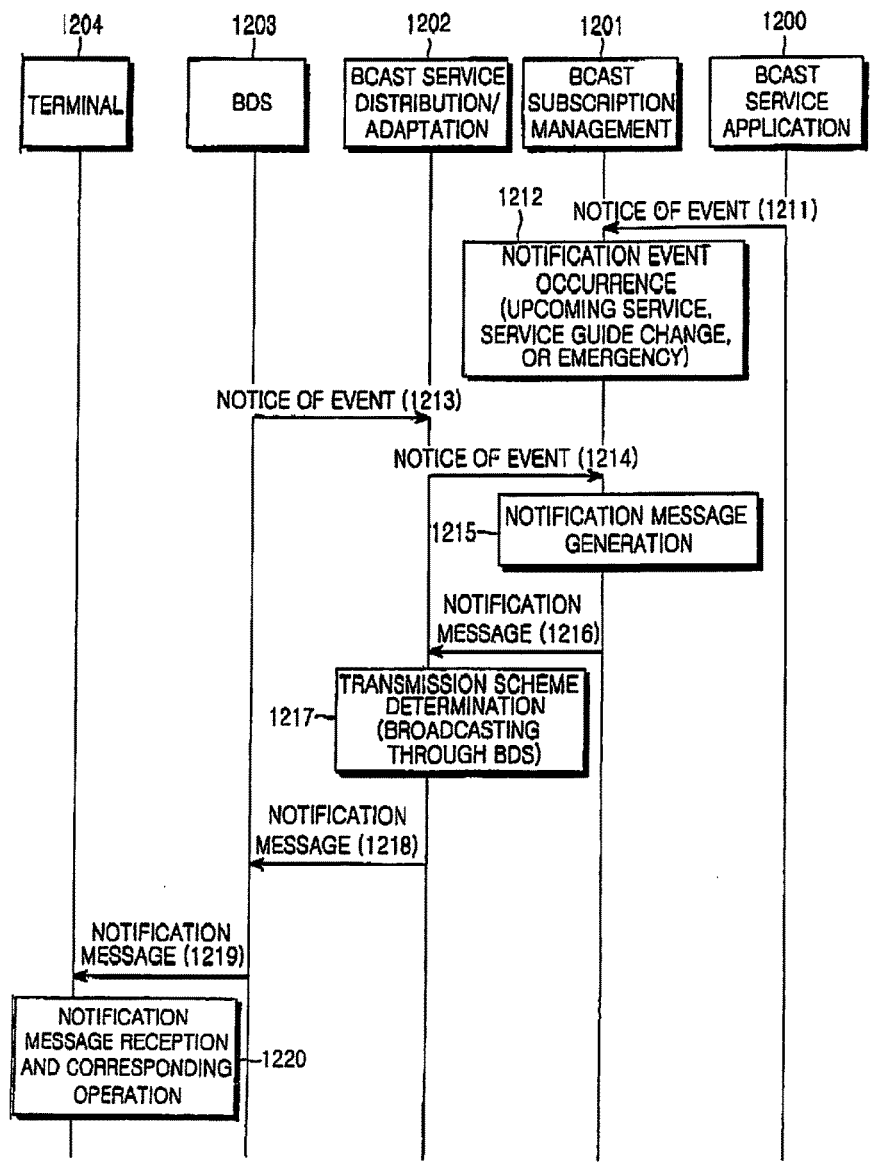
FIG. 12 illustrates a message flow for sending a notification message generated from a BCAST SM to a terminal through a broadcast network according to the third embodiment of the present invention.

FIG. 12 illustrates a message flow for sending a notification message generated from the BCAST SM to the terminal through the BDS according to the third embodiment of the present invention. A BCAST SA 1200 with the NTE 1102-1, a BCAST SM 1201 with the NTG 1104-1, a BCAST SD/A 1202 with the NTDA 1103-1, a BDS 1203 and a terminal 1204 illustrated in FIG. 12 operate as illustrated in FIG. 11.

Referring to FIG. 12, a notification event occurs in step 1211, step 1212 or step 1213. Specifically, upon generation of a notification event in a CC or the BCAST SA 1200, the BCAST SA 1200 sends a notice of the notification event to the BCAST SM 1201 in step 1211. Upon generation of a notification event in the BDS 1203, the BDS 1203 sends a notice of the notification event to the BCAST SD/A 1202 in step 1213 and the BCAST SD/A 1202 sends the notice of the notification event to the BCAST SM 1201 in step 1214. The BCAST SM 1201 senses an internal occurrence of a notification event in step 1212. After creating a notification message about the notification event in step 1215, the BCAST SM 1201 sends the notification message to the BCAST SD/A 1202 in step 1216.

In step 1217, the BCAST SD/A 1202 decides to send the notification message through the BDS 1203. How to send the notification message depends on the application range of the notification message or the condition of a channel to deliver the notification message. In the case where a significant event occurs to a service that a plurality of terminals have subscribed to, wired/wireless resources are saved by sending the notification message to them through the BDS 1203.

In step 1218, the BCAST SD/A 1202 sends the notification message to the BDS 1203. The BDS 1203 sends the notification message to the terminal 1204 by an appropriate scheme in step 1219. The appropriate scheme can be provisioning of a BCAST service which can deliver the notification message.

In step 1220, the terminal 1204 receives the notification message and operates in correspondence with the notification message. For example, the terminal 1204 informs a user of a service schedule change or a changed SA. If the SA indicated by the notification message is identical to a stored SA, the terminal 1204 does not receive the SA, thus saving power.

Figure 13:
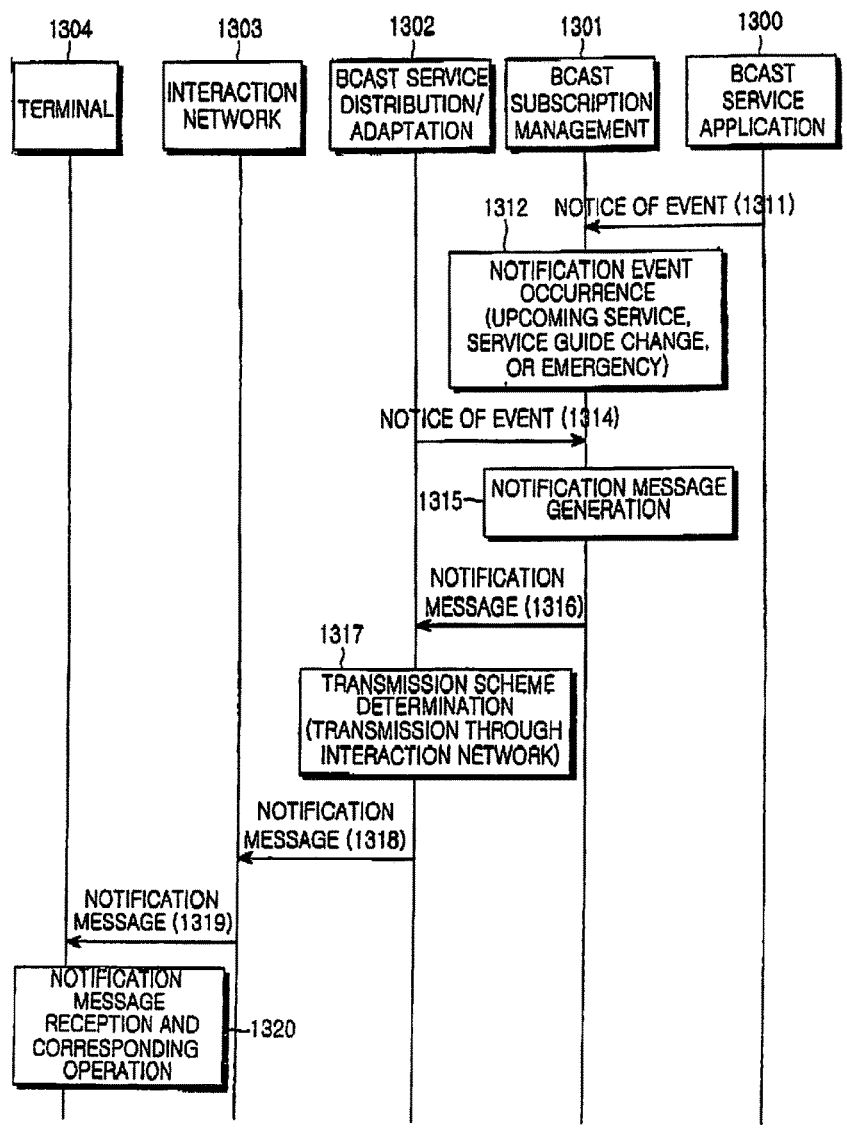
FIG. 13 illustrates a message flow for sending a notification message generated from the BCAST SM to the terminal through an interaction network according to the third embodiment of the present invention.

FIG. 13 illustrates a message flow for sending a notification message generated from the BCAST SM to the terminal through the interaction network according to the third embodiment of the present invention. A BCAST SA 1300 with the NTE 1102-1, a BCAST SM 1301 with the NTG 1104-1, a BCAST SD/A 1302 with the NTDA 1103-1, an interaction network 1303 and a terminal 1304 illustrated in FIG. 13 operate as illustrated in FIG. 11.

Referring to FIG. 13, a notification event occurs in step 1311, step 1312 or step 1314. Specifically, upon generation of a notification event in a CC or the BCAST SA 1300, the BCAST SA 1300 sends a notice of the notification event to the BCAST SM 1301 in step 1311. While not shown in FIG. 13, upon generation of a notification event in the BDS 1303, the BDS 1303 sends a notice of the notification event to the BCAST SD/A 1302. Then the BCAST SD/A 1302 sends the notice of the notification event to the BCAST SM 1301 in step 1314. The BCAST SM 1301 senses an internal occurrence of a notification event in step 1312. After creating a notification message about the notification event in step 1315, the BCAST SM 1301 sends the notification message to the BCAST SD/A 1302 in step 1316.

In step 1317, the BCAST SD/A 1302 decides to send the notification message through the interaction network 1303. How to send the notification message depends on the application range of the notification message or the condition of a channel to deliver the notification message. Two schemes are available to the BCAST SD/A 1302 in sending the notification message. One of them is to include the notification message in an OMA SMS or MMS message by the BCAST SD/A 1302 so that the interaction network 1303 simply forwards the SMS or MMS message. The other is to send the notification message to the interaction network 1303 so that the interaction network 1303 sends the notification message to the terminal 1304 by an SMS or MMS message.

In step 1319, the interaction network 1303 sends the notification message to the terminal 1304 by the SMS or MMS message. Then the terminal 1304 operates in correspondence with the notification message, as described earlier in step 1320.

In accordance with the present invention as described above, a notification message indicating a system change or a service change is sent in a BCAST system. To support the method, a notification message structure and a BCAST network architecture for sending the notification message have been proposed. As a result, interruption of an on-going BCAST service can be minimized in a terminal and power consumption can be minimized in receiving a BCAST service and an SG at the terminal.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method of transmitting a notification about broadcasting services in a broadcasting system, the method comprising:
   detecting, by a network entity, a notification event about a broadcasting service, the notification event including a change of a service guide of the broadcasting service;
   generating, by the network entity, a notification message about the notification event;
   determining, by the network entity, which channel is used for a transmission of the notification message; and
   transmitting, by the network entity, the notification message to a terminal or a group of terminals over the determined channel,
   wherein determining which channel is used for the transmission of the notification message comprises determining whether the notification message is transmitted over a broadcast channel of a broadcast network or over an interaction channel of an interaction network, and
   wherein the service guide is generated based on service guide related information provided by a service provider of the broadcasting service.

2. The method of claim 1, wherein determining which channel is used for the transmission of the notification message comprises determining an availability of a channel and a number of terminals that will receive the notification message.

3. The method of claim 1, wherein the notification message includes at least one of a service identifier (ID) indicating the broadcasting service related with the notification message, a reason for transmitting the notification message, and a version number of the service guide of the broadcasting service.

4. The method of claim 1, wherein the notification message has a format of a short messaging service (SMS) message or a multimedia messaging service (MMS) message to be transmitted over an interaction channel of an interaction network.

5. The method of claim 1, wherein the notification message includes a service guide identifier (ID) indicating the service guide related with the notification message.

6. The method of claim 1, wherein the notification message includes a header indicating a message type, a message length, and a number of notifications related to different services that are included in the notification message.

7. The method of claim 1, wherein the notification message includes a header indicating a message type, a message length, a number of notifications included in the notification message, and at least one notification related to different service guides.

8. A network entity for transmitting a notification about broadcasting services in a broadcasting system, the network entity comprising:
   a processer for detecting a notification event related to a broadcasting service, generating a notification message about the notification event, and determining which channel is used for transmitting the notification message, the notification event including a change of a service guide of the broadcasting service; and
   a transmitter for transmitting the notification message to a terminal or a group of terminals over the channel determined by the processor,
   wherein the processor determines whether the notification message is transmitted over a broadcast channel of a broadcast network or over an interaction channel of an interaction network, and
   wherein the service guide is generated based on service guide related information provided by a service provider of the broadcasting service.

9. The network entity of claim 8, wherein the channel to be used for a transmission of the notification message is determined according to an availability of a channel and a number of terminals that will receive the notification message.

10. The network entity of claim 8, wherein the notification message includes at least one of a service identifier (ID) indicating the broadcasting service related with the notification message, a reason for transmitting the notification message, and a version number of the service guide of the broadcasting service.

11. The network entity of claim 8, wherein the notification message has a format of a short messaging service (SMS) message or a multimedia messaging service (MMS) message to be transmitted over an interaction channel of an interaction network.

12. The network entity of claim 8, wherein the notification message includes a service guide identifier (ID) indicating the service guide related with the notification message.

13. The network entity of claim 8, wherein the notification message includes a header indicating a message type, a message length, and a number of notifications related to different services that are included in the notification message.

14. The network entity of claim 8, wherein the notification message includes a header indicating a message type, a message length, and a number of notifications related to a different service guide that are included in the notification message.

15. A method of receiving a notification about broadcasting services from a broadcasting system, the method comprising:
   receiving, by a terminal, a notification message over a broadcast channel of a broadcast network or an interaction channel of an interaction network; and detecting, by the terminal, a notification event about a broadcasting service based on the notification message,
wherein the channel over which the notification message is received is determined by a network entity,
wherein the notification event includes a change of a service guide of the broadcasting service, and
wherein the service guide is generated based on service guide related information provided by a service provider of the broadcasting service.

16. The method of claim 15, wherein the notification message is received via the broadcast channel or the interaction channel according to an availability of a channel and a number of terminals that will receive the notification message.

17. The method of claim 15, wherein the notification message includes at least one of a service identifier (ID) indicating the broadcasting service related with the notification message, a reason for transmitting the notification message, and a version number of the service guide of the broadcasting service.

18. The method of claim 15, wherein the notification message includes a service guide identifier (ID) indicating the service guide related with the notification message.

19. The method of claim 15, wherein the notification message includes a header indicating a message type, a message length, and a number of notifications related to different services that are included in the notification message.

20. The method of claim 15, wherein the notification message further includes a header indicating a message type, a message length, and a number of notifications related to different service guides that are included in the notification message.

21. A terminal for receiving a notification about broadcasting services from a broadcasting system, the terminal comprising:

a receiver for receiving a notification message over a broadcast channel of a broadcast network or an interaction channel of an interaction network; and
a processor for detecting a notification event about a broadcasting service based on the received notification message,
wherein the channel over which the notification message is received is determined by a network entity,
wherein the notification event includes a change of a service guide of the broadcasting service, and
wherein the service guide is generated based on service guide related information provided by a service provider of the broadcasting service.

22. The terminal of claim 21, wherein the notification message is received via the broadcast channel or the interaction channel according to an availability of a channel and a number of terminals that will receive the notification message.

23. The terminal of claim 21, wherein the notification message includes a service identifier (ID) indicating a broadcasting service related with the notification message, a reason for transmitting the notification message, and a version number of the service guide of the broadcasting service.

24. The terminal of claim 21, wherein the notification message includes a service guide identifier (ID) indicating the service guide related with the notification message.

25. The terminal of claim 21, wherein the notification message includes a header indicating a message type, a message length, and a number of notifications related to different services that are included in the notification message.

26. The terminal of claim 21, wherein the notification message includes a header indicating a message type, a message length, and a number of notifications related to different service guides that are included in the notification message.

* * * * *